(12) United States Patent
Hartmann

(10) Patent No.: US 6,756,880 B2
(45) Date of Patent: Jun. 29, 2004

(54) READER AND RESPONSE CONTROL SYSTEM FOR DISCRIMINATION BETWEEN MULTIPLE SURFACE ACOUSTIC WAVE IDENTIFICATION TAGS AND METHOD OF OPERATION THEREOF

(75) Inventor: Clinton S. Hartmann, Dallas, TX (US)

(73) Assignee: RF SAW Component Incorporated, Richardson, TX (US)

(*) Notice: Subject to any disclaimer, the term of this patent is extended or adjusted under 35 U.S.C. 154(b) by 198 days.

(21) Appl. No.: 10/103,684

(22) Filed: Mar. 21, 2002

(65) Prior Publication Data
US 2003/0179072 A1 Sep. 25, 2003

(51) Int. Cl.[7] .............................................. H04Q 5/22
(52) U.S. Cl. .................. 340/10.42; 340/10.1; 340/10.2; 340/5.61; 340/539.1; 340/572.7; 340/10.4; 310/313 R; 310/313 A; 310/313 B; 310/315; 342/25
(58) Field of Search .............................. 340/10.42, 10.2, 340/10.1, 5.61, 539.1, 572.7, 10.4; 310/313 R, 313 D, 313 A, 313 B, 315; 342/25, 44

(56) References Cited

U.S. PATENT DOCUMENTS

| | | | | |
|---|---|---|---|---|
| 3,691,557 A | * | 9/1972 | Constant et al. | 342/25 |
| 4,117,481 A | * | 9/1978 | Constant | 342/44 |
| 5,648,765 A | * | 7/1997 | Cresap et al. | 340/10.4 |
| 5,910,779 A | | 6/1999 | Bulst et al. | |
| 5,986,382 A | * | 11/1999 | Nysen | 310/313 D |

FOREIGN PATENT DOCUMENTS

| | | |
|---|---|---|
| DE | 19957557 A1 | 6/2001 |
| DE | 10010948 A1 | 9/2001 |

* cited by examiner

Primary Examiner—Michael Horabik
Assistant Examiner—Yves Dalencourt

(57) ABSTRACT

A system for discriminating between coded responses from multiple SAW identification tags and a method of operating such system. In one embodiment the system provides for a SAW tag reader subsystem that detects coded responses from the tags to an interrogation pulse; and a coded response analyzing subsystem, coupled to the SAW tag reader subsystem, that employs signal processing techniques to separate portions of the coded responses and generates possibilities for remaining portions of the coded responses.

21 Claims, 3 Drawing Sheets

READER AND RESPONSE CONTROL SYSTEM FOR DISCRIMINATION BETWEEN MULTIPLE SURFACE ACOUSTIC WAVE IDENTIFICATION TAGS AND METHOD OF OPERATION THEREOF

TECHNICAL FIELD OF THE INVENTION

The present invention is directed, in general, to a system for discrimination between multiple surface acoustic wave (SAW) identification tags and, more specifically, to a reader and response control system for discrimination between multiple SAW identification tags and a method of operation thereof.

BACKGROUND OF THE INVENTION

A number of different types of electronic identification methods and devices are currently being employed ranging from ubiquitous bar codes and magnetic strips to sophisticated radio frequency identification ("RFID") devices. In the case of bar codes and magnetic strips, a significant limiting factor is the relatively short effective range. Magnetic strips, for example, generally require the reader to be in direct contact with the strip in order to detect and decode any data. In those few cases where a magnetic strip is read with a device other than a direct contact reader, the effective reading range is still only a few centimeters at best. Similarly, the effective range for reliably reading bar codes is also typically no better than a few centimeters, at best. Because the range at which bar codes and magnetic strips can be read is so short, they are usually read one at a time and seldom does one bar code or magnetic strip interfere with another.

Most RFID tags can be conveniently divided into chip tags and chipless tags. Chipless tags generally have no longer a read range than bar codes or magnetic strips. Although prior art RFID chip tags can be fabricated that have a significantly longer reliable read range than chipless tags, magnetic strips or bar codes, they are generally so expensive that their use is generally limited to discrete applications where the expense can be justified economically. In most cases, these prior art RFID chip tags are individually read and little opportunity exists for tag responses to interfere with one another.

A recently developed RFID tag with a long read range that can be inexpensively fabricated requires the problem of interference from multiple tag responses to an interrogation signal to be addressed. A complete and detailed description of SAW identification tags 120 is set forth in detail in U.S. patent application Ser. No. 20030111540, entitled "Surface Acoustic Wave Identification Tag Having Enhanced Data Content and Methods of Operation and Manufacture Thereof," Hartmann, Clinton S. ("Hartmann One"), commonly assigned with the invention and incorporated herein by reference. A description of SAW identification tag readers 130 to read such tags is described in detail in U.S. patent application Ser. No. 20030141366, entitled "Reader For a High Information Capacity Saw Identification Tag and Method of Use Thereof," Hartmann, Clinton S. ("Hartmann Three"), also commonly assigned with the invention and incorporated herein by reference. Because such tags are inexpensive enough to be attached to a large number of objects (such as objects on a shipping pallet) and because they have sufficient range to permit a tag reader to interrogate a large number of tags at the same time, the signal interference or code collision problem caused by multiple responses must be addressed as well as any inter-symbol interference problems caused by so many responses being transmitted at one time. These issues need to be resolved before the full potential of SAW identification tags can be realized.

Accordingly, what is needed in the art are systems and methods that permit a user to reliably distinguish between multiple responses to an interrogation signal that are emanating from SAW tags that are in close proximity.

SUMMARY OF THE INVENTION

To address the above-discussed deficiencies of the prior art, the present invention provides a system for discriminating between coded responses from multiple SAW identification tags and a method of operating such system. In one embodiment the system provides for (1) a SAW tag reader subsystem that detects coded responses from the tags to an interrogation pulse; and (2) a coded response analyzing subsystem, coupled to the SAW tag reader subsystem, that employs signal processing techniques to separate portions of the coded responses and generates possibilities for remaining portions of such coded responses.

The present invention thus provides a system for distinguishing between multiple responses to an interrogation signal that emanate from SAW tags in close proximity where a "collision" exists between such responses in the signal processing sense of this term. The successful identification of a SAW tag requires that positive and reliable determination of the data encoded on a single SAW tag. Thus, it is essential that a SAW identification tag system be able to separate and identify the signature of a single tag from the signatures of other SAW tags responding to an interrogation signal. A beneficial feature of the present invention is that it can be structured to provide for a "hierarchical" control operating system that can be used to determine the correct responses of SAW tags in collision based on all the multiple factors used to determine signal responses.

In one embodiment the system provides for using signal processing techniques that consist of developing a synthetic coded response from the responses of the SAW tag to be identified and generating identification possibilities from such synthetic response. In another embodiment the system only identifies coded responses based on a a particular hierarchical tag level. In still another embodiment, the system signal processing techniques comprise examining at least one known tag anomaly.

A particularly useful embodiment that can be adapted to the environment where the SAW tags will be employed utilizes signal processing techniques comprised of analyzing at least one tag environmental factor. An aspect of this embodiment provides for the environmental factor is selected from the group consisting of: temperature drift; frequency drift; SAW tag position; SAW tag orientation; SAW tag motion; and SAW tag direction of travel.

In yet still another embodiment the system is further comprised of a sensor subsystem that detects other physical properties of the tags, the coded response analyzing subsystem employing the signal processing techniques and the physical properties to generate the possibilities. The present invention also provides for a method of operating the foregoing system and the various embodiment of such system. In another embodiment of the invention the system is further comprised of an inertial guidance system. As aspect of this embodiment provides for the inertial guidance system to be selected from the group consisting of: an inertial guided antenna system; an inertial guided reader system; and an inertial guided platform system.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
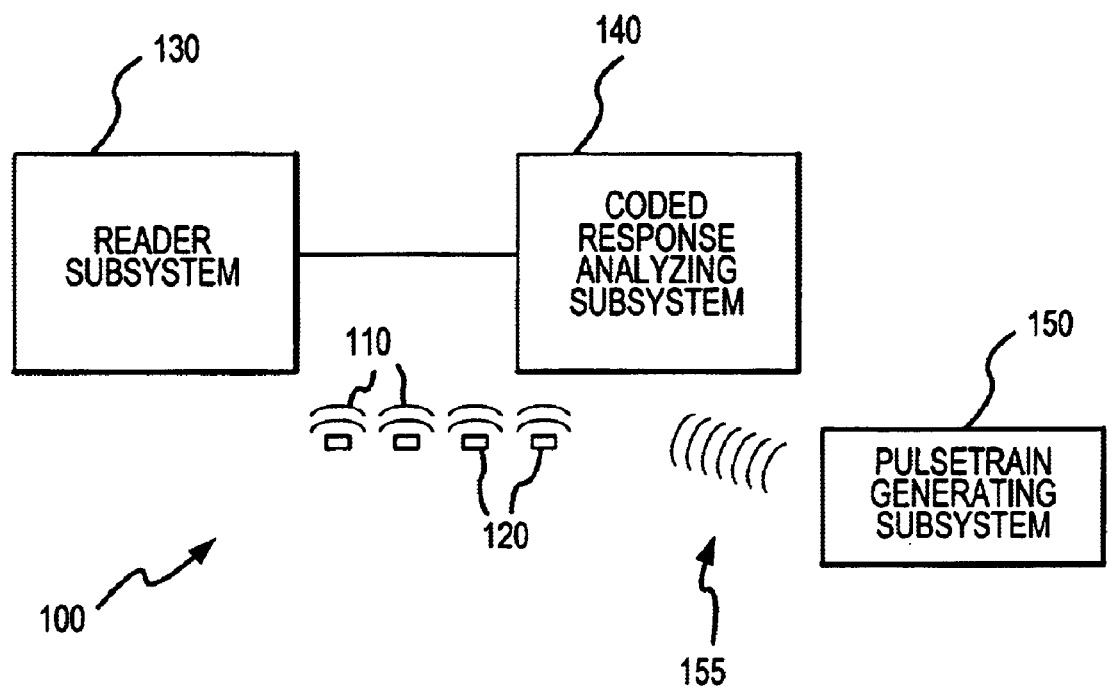
FIG. 1 illustrates a block diagram of an embodiment of the present invention that provides a system for discrimination between coded responses from multiple SAW identification tags.

Referring initially to FIG. 1, illustrated is a block diagram of an embodiment of the present invention that provides a system 100 for discrimination between coded responses 110 from multiple SAW identification tags 120. The system 100 includes a SAW tag reader subsystem 130 to detect the coded responses 110, coupled to which is a coded response analyzing subsystem 140. The coded response analyzing subsystem 140 employs any one of a number of signal processing techniques to separate portions of the coded responses 110 and generate possibilities for the remaining portions of such coded responses 110.

A detailed description of SAW identification tags and SAW identification tag readers is not set forth herein. Instead reference is hereby made to U.S. patent application Ser. No. [Attorney Docket No. RFSC-0001], entitled "Surface Acoustic Wave Identification Tag Having Enhanced Data Content and Methods of Operation and Manufacture Thereof," Hartmann, Clinton S. ("Hartmann One"), commonly assigned with the invention and incorporated herein by reference, where SAW identification tags are described in detail. A description of SAW identification tag readers 130 is described in detail in U.S. patent application Ser. No. [Attorney Docket No. RFSC-0003], entitled "Reader For a High Information Capacity Saw Identification Tag and Method of Use Thereof," Hartmann, Clinton S. ("Hartmann Three"), also commonly assigned with the invention and incorporated herein by reference.

Figure 2:
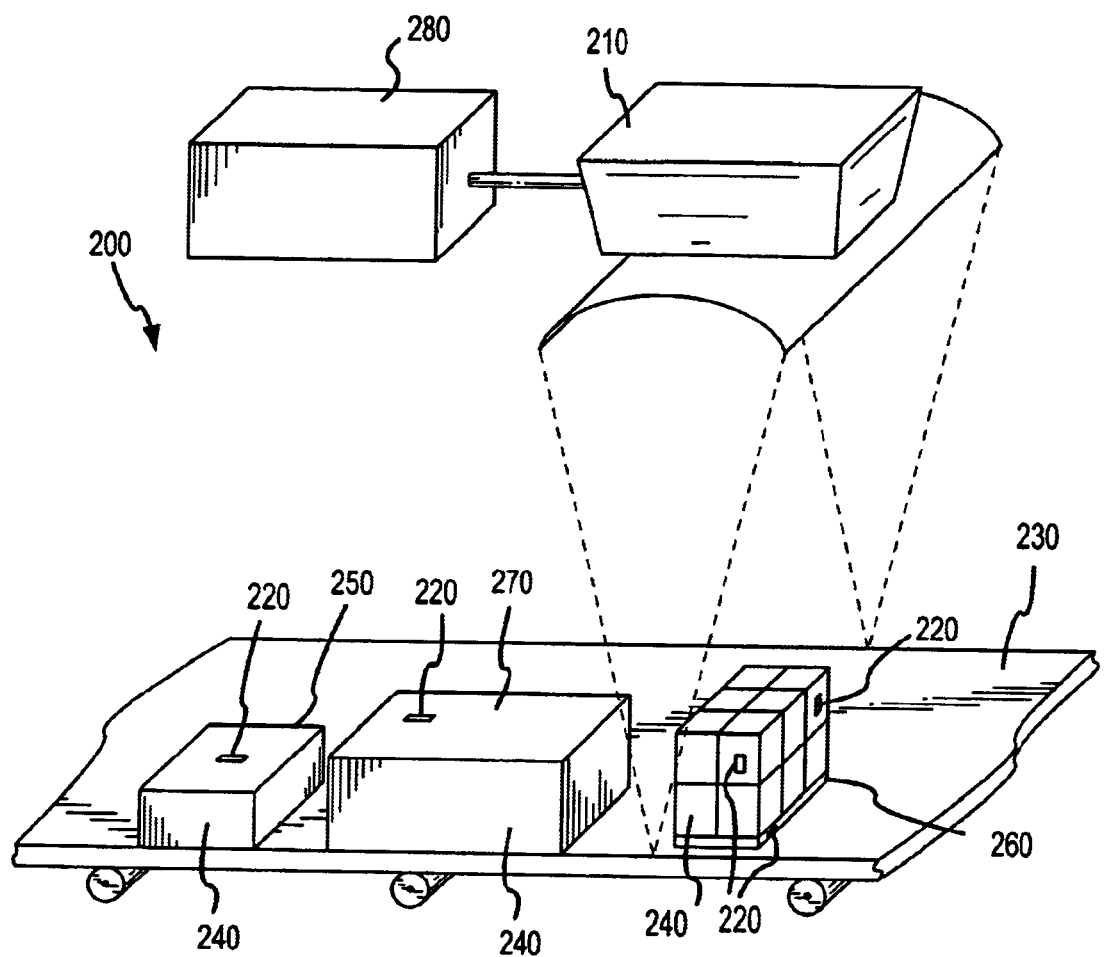
FIG. 2 illustrates an embodiment of a parcel handling apparatus employing a SAW tag reader to identify SAW tags.

Turning now to FIG. 2, illustrated is an embodiment of an inventory handling apparatus 200 that employs a SAW tag reader 210 to identify SAW tags 220. The illustrated handling apparatus 200 is typical of those used by a number of warehouse facilities to receive, store, sort and ship goods, such as groceries, car parts, etc. A conveyor belt 230 is used to transports articles 240 from one location in the warehouse to another, such as from the warehouse floor to a shipping dock, or vice versa. The articles 240 on the conveyor belt 230 can be individual items 250 or they can be a quantity of individual items 250 on a pallet 260, in a carton 270, etc. In each case the individual item 250, as well as each pallet 260, carton 270, etc., is associated with a SAW identification tag 220 located thereon with the association being made by a computer 280 coupled to the reader 210.

To read each SAW tag 220, the reader 210 is located in a position relative to the belt 230 to send an interrogation pulse to each SAW tag 220 and receive a response therefrom. A detailed description of the reader 210 operation is set forth in Hartmann Three and the SAW tag 220 in Hartmann One, each of which has been incorporated herein. When a number of articles 240 are interrogated at the same time, such as where a pallet 260 contains a number of cartons 270 that also contain a number of items 250 (not shown), each SAW tag 220 will return a response, the number of which can be quite large. A number of responses emanating from SAW tags 220 in close proximity can result in signal "collisions," as such term is understood within the context of signal processing. The various embodiments of the invention described herein address this collision problem.

Figure 3:
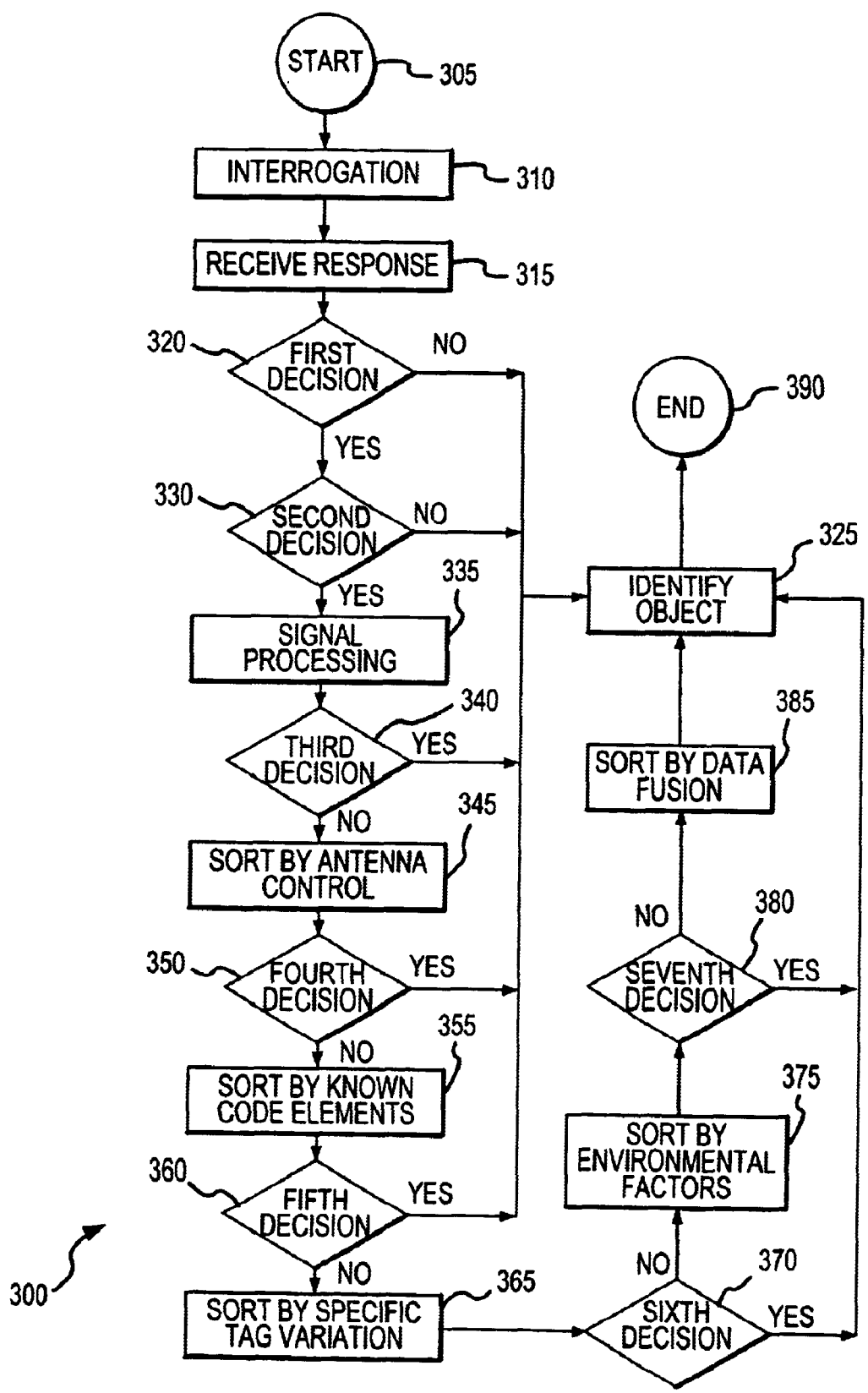
FIG. 3 illustrates a flow chart of an embodiment of a reader and response control system constructed in accordance with the present invention for discrimination between multiple SAW identification tags.

Turning now to FIG. 3, illustrated is a flow chart of an embodiment of a reader and response control system 300 constructed in accordance with the present invention for discrimination between multiple SAW identification tags. The system 300 commences with a start step 305. In an interrogation step 310, a SAW tag reader transmits an interrogation signal to which each SAW tag responds. The SAW tag reader receives the response or responses in a receive response step 315. In a first decision step 320, the system inquires as to whether multiple responses were received. If the answer is no, the SAW tag is identified, as well as the object to which it is attached, in an identify SAW tag step 325 and the system concludes its process with an end step 390. If multiple responses were received and the answer is yes, in a second decision step 330 the system determines whether a conflict exists. If the answer is no because each of the responses can be read, the system 300 identifies the SAW tags with their associated objects in the identify SAW tag step 325 and concludes the process with the end step 390.

If all the SAW tag responses can not be read, the system 300 answers the second decision step 330 with a yes and proceeds to a signal processing step 335. A signal processing techniques or functions exist that can be performed to identify the various SAW tags, all of which are within the intended scope of the present invention. One technique to resolve the difference between multiple tags is to use inverse synthetic signal aperture technology. Synthetic aperture technology refers to a moving platform, such as an airplane in flight, obtaining multiple returns from sequential pulses sent by from the platform and using signal processing to enhance signal to noise to separate objects and provide a clear picture of what the platform is crossing. Inverse synthetic aperture technology provides for the platform receiving the pulses to be stationary and the target to move, instead of the other way around. Referring back to FIG. 2, as the conveyor belt 230 moves articles 240 along, the SAW tag reader 210 will send multiple interrogation signals and each interrogated SAW tag 220 will send multiple responses. Using signal processing techniques familiar to those of ordinary skill in the pertinent art, synthetic coded responses can be constructed and the various SAW tag 220 identification possibilities can be determined.

Other signal processing techniques for identifying the various SAW tags 220 use the characteristics of the SAW tags 220 being interrogated. For example, SAW tags 220 associated with certain articles 240 may have different response characteristics, such a different time delays in responding to an interrogation pulse. Such time delays can be provided for in the structure of the SAW tag 240 layout by the physical separation between the signal input transducers and the reflectors encoding a response, which features are discussed in detail in Hartmann One. The time delay is due to the slow propagation of the SAW in the SAW tag substrate.

Referring again to FIG. 1, if the SAW tags 220 on the pallets 260, cartons 270 and individual items 250 each have a different time delay for response, the reader can use signal processing techniques to interrogate and sort the various articles 240 based on such SAW tag response times. In short, the articles 240 each have a SAW tag 220 that permits coded responses that are limited to a particular hierarchical SAW tag 220 level.

Returning now to FIG. 3, in a third decision step 340 inquiry is made as to whether the SAW tags can now all be identified after the system 300 completes its signal processing techniques. If the answer is yes, the SAW tags are identified in an identify objects step 325 and the process is finished with the end step 390. If the answer is no, then the illustrated embodiment of the system 300 provides for a sort by antenna control step 345. A detailed description of antennas and their use with respect to SAW tags is set forth in U.S. patent application Ser. No. [Attorney Docket No. RFSC-0009], entitled "Anti-collision Interrogation Pulse Focusing System For Use With Multiple Surface Acoustic Wave Identification Tags And Method of Operation Thereof," Hartmann, Clinton S., et al. ("Hartmann Nine"), commonly assigned with the invention and incorporated herein by reference. The various techniques described in Hartmann Nine can be used to resolve SAW tag collision problems as can other antenna techniques, all of which are within the intended scope of the present invention. In a fourth decision step 350, a decision is made as to whether the SAW tags can now all be identified. If yes, the SAW tags are identified in the identify objects step 325 and the system 300 process is finished with the end step 390. If the answer is still no, the illustrated embodiment then provides for a sort by known code elements step 355.

In the sort by known code elements step 355, signal processing techniques are employed to eliminate some of the SAW tag coded responses and narrow down the potential SAW tag choices that could return a response. Hartmann One describes SAW tags where space on the SAW tag substrate is provided for encoding header data as well as framing and synchronization elements. This information can be used to narrow the identification choices among the SAW tags that respond to an interrogation pulse. In addition, provision can be made on the SAW tag for error correction which feature can be beneficially employed to eliminate identification choices that, among other things, provide a flawed response to an interrogation signal. There are a number of other known code elements that can be used to resolve collisions, all of which are within the intended scope of the present invention. In a fifth decision step 360, a decision is made as to whether all the SAW tags can now be identified. If yes, the identify object step 325 provides for the SAW tags to be identified and the process is completed with the end step 390. If the answer is no, the illustrated embodiment invention provides for a sort by specific tag variations step 365.

In the sort by specific tag variations step 365, processing techniques are used to further eliminate SAW tag identification possibilities. For example, different frequencies can be used to interrogate SAW tags or the coded response to an interrogation signal can have distinctive identifiable frequency. In one embodiment, a sensor subsystem can be used to detect certain physical properties of the SAW tags that signal processing techniques can analyze and determine various SAW tag identification possibilities. The changes or differences in SAW tag signatures produced by factors, such as temperature, motion, and fabrication tolerances, can also be known factors that assist in sorting SAW tags. Known features in the specific code modulation technique used for SAW tags can also used to aid in SAW tag signature separation. These as well as any other SAW tag variation or distinctive anomaly can be used to sort out the various SAW tag responses. Upon completion of the sort by specific tag variations 365, a sixth decision step 370 is provided. If all the SAW tags can now be identified and the answer to the sixth decision step 370 is yes, the system provides for identification of the SAW tags in the identify object step 325 and the process is completed with the end step 390. If the answer is no, the illustrated embodiment invention then proceeds to sort by environmental factors step 375.

In the sort by environmental factors step 375, at least one SAW tag environmental factor is analyzed to resolve any collisions between SAW tag responses. The environmental factors considered could be any one of a number of such factors. For example, if SAW tags are being used to track frozen foods, any SAW tag that does not respond with a characteristic response of a SAW tag having a temperature within the temperature range of the frozen food would be eliminated from consideration as a potential candidate for responding to an interrogation pulse directed towards frozen food items. Other environmental factors that can be used include temperature drift; frequency drift; SAW tag position; SAW tag orientation; SAW tag motion; SAW tag direction of travel, as well as others that will become apparent depending on the environment within which the SAW tag or SAW tags are used. Any one of these various environmental factors can be used to resolve collisions between SAW tag responses and still be within the intended scope of the present invention. Upon completion of the sort by environmental factors step 375, the illustrated embodiment provides for a seventh decision step 380. If all SAW tags returning a response can now be identified, the answer to the seventh decision step 380 is yes and the SAW tags are identified in the identify object step 325. The system 300 then provides for completion of the process with the end step 390. If the answer to the seventh decision step 380 in the illustrated embodiment of the invention is no, the system 300 proceeds to a sort by data fusion step 385.

In the sort by data fusion step 385, data and signal processing techniques are combined with other identification techniques and methods to definitively resolve identification of the SAW tag signals that are in collision. Such other techniques may include visual techniques, such as a visual imager or an infrared signature. The techniques may also rely on the weight or position of the article to be identified. In any case, the use of the data fusion step 385 is a last resort step to resolve any collision problems remaining after the other steps described herein are completed. In another embodiment of a data fusion step, inertial guidance systems can be fused with data and signal processing techniques. Such an inertial guidance system can be selected from the group consisting of: an inertial guided antenna system; an inertial guided reader system; and an inertial guided platform system. After completion of this step, the item with a SAW tag is identified in the identify object step 325 and the system completes its identification process with the end step 390.

As will be understood by those of ordinary skill in the pertinent art, the system level algorithm methodology described herein can be varied by adding, combining or subtracting steps, or by changing the order in which steps occur and still be within the intended scope of the present invention. In addition, those of ordinary skill in the pertinent art may add to or vary the steps provided for herein and still be within the scope of the intended invention.

The present invention also provides for methods of discriminating between coded responses from multiple SAW identification tags and a method of operating a system for discriminating between such coded responses. Such methods will be clear to those of ordinary skill in the pertinent art from the detailed description of the system itself.

In one embodiment of the present invention a system for verifying a coded response by a SAW identification tag to an interrogation pulse is provided. This system provides for a pulsetrain generating subsystem 150 (illustrated in FIG. 1) to generate a pulsetrain 155 that is a time-reversed form of the SAW tag coded response. Based on the well known characteristics of SAW tags, the SAW tag reader subsystem 130 to a pulsetrain generating subsystem 150 will receive a pronounced pulse from the SAW tag 120 that will approximate the interrogation pulse, thus providing a final resolution of any SAW tags 120 transmitting responses that are in collision with one another.

Although the present invention has been described in detail, those skilled in the art should understand that they can make various changes, substitutions and alterations herein without departing from the spirit and scope of the invention in its broadest form.

What is claimed is:

1. A system for discriminating coded responses from multiple SAW identification tags, comprising:
    a SAW tag reader subsystem that detects coded responses from said tags to an interrogation pulse; and
    a coded response analyzing subsystem, coupled to said SAW tag reader subsystem, that employs signal processing techniques to develop a synthetic coded response from said coded responses and generates possibilities from said synthetic coded response.

2. The system as recited in claim 1 wherein said coded responses are limited to coded responses from a particular hierarchical tag level.

3. The system as recited in claim 1 wherein said signal processing techniques comprise examining at least one known tag anomaly.

4. The system as recited in claim 1 wherein said signal processing techniques comprise analyzing at least one tag environmental factor.

5. The system as recited in claim 4 wherein said environmental factor is selected from the group consisting of:
    temperature drift;
    frequency drift;
    position;
    orientation;
    motion; and
    direction of travel.

6. The system as recited in claim 1 further comprising a sensor subsystem that detects other physical properties of said tags, said coded response analyzing subsystem employing said signal processing techniques and said physical properties to generate said possibilities.

7. The system as recited in claim 1 further comprising an inertial guidance system.

8. The system as recited in claim 7 wherein said inertial guidance system is selected from the group consisting of:
    an inertial guided antenna system;
    an inertial guided reader system; and
    an inertial guided platform system.

9. A method to discriminate between coded responses from multiple SAW identification tags, comprising:
    detect coded responses to an interrogation pulse from said tags with a SAW tag reader subsystem; and
    separate portions of said coded responses and generate possibilities for remaining portions of said coded responses by employing signal processing techniques to develop a synthetic coded response with a coded response analyzing subsystem coupled to said SAW tag reader subsystem.

10. The system as recited an claim 9 wherein said coded responses are limited to coded responses from a particular hierarchical tag level.

11. The system as recited in claim 9 wherein said signal processing techniques comprise examining at least one known tag anomaly.

12. The system as recited in claim 9 wherein said signal processing techniques comprise analyzing at least one tag environmental factor.

13. The system as recited in claim 12 wherein said environmental factor is selected from the group consisting of:
    temperature drift;
    frequency drift;
    position;
    orientation;
    motion; and
    direction of travel.

14. The system as recited in claim 9 further comprising employing a sensor subsystem to detects other physical properties of said tags, said coded response analyzing subsystem using said signal processing techniques and said physical properties to generate said possibilities.

15. A method of operating a system for discriminating between coded responses from multiple SAW identification tags, comprising:
    detecting coded responses to an interrogation pulse from said tags with a SAW tag reader subsystem; and
    separating portions of said coded responses and generating possibilities for remaining portions of said coded responses by employing signal processing techniques to develop a synthetic coded response with a coded response analyzing subsystem coupled to said SAW tag reader subsystem.

16. The system as recited in claim 15 wherein said coded responses are limited to coded responses from a particular hierarchical tag level.

17. The system as recited in claim 15 wherein said signal processing techniques comprise examining at least one known tag anomaly.

18. The system as recited in claim 15 wherein said signal processing techniques comprise analyzing at least one tag environmental factor.

19. The system as recited in claim 18 wherein said environmental factor is selected from the group consisting of:

temperature drift;
frequency drift;
position;
orientation;
motion; and
direction of travel.

20. The system as recited in claim 18 further comprising a sensor subsystem that detects other physical properties of said tags, said coded response analyzing subsystem employing said signal processing techniques and said physical properties to generate said possibilities.

21. A system for verifying a coded response by a SAW identification tag to an interrogation pulse, comprising:

a pulsetrain generating subsystem that generates a pulsetrain that is a time-reversed form of said coded response; and a SAW tag reader subsystem, coupled to said pulsetrain generating subsystem, that receives a pronounced pulse from said tag that approximates said interrogation pulse.

* * * * *

UNITED STATES PATENT AND TRADEMARK OFFICE
CERTIFICATE OF CORRECTION

PATENT NO. : 6,756,880 B2
DATED : June 29, 2004
INVENTOR(S) : Clinton S. Hartmann It is certified that error appears in the above-identified patent and that said Letters Patent is hereby corrected as shown below:

Column 1,
Line 51, "20020111540" should be -- 10/024,624 --.
Line 58, "20030141366" should be -- 10/066,249 --.

Column 2,
Line 43, "a a particular" should be -- a particular --.

Column 3,
Line 48, "[Attorney Docket No. RFSC-0001]" should be -- 10/024,624 --.
Line 56, "[Attorney Docket No. RFSC-0003]" should be -- 10/066,249 --.

Column 5,
Lines 30 and 31, "[Attorney Docket No. RFSC-0009]" should be -- 10/103,650 --.

Signed and Sealed this

Thirty-first Day of August, 2004

JON W. DUDAS
*Director of the United States Patent and Trademark Office*